US012802099B2

(12) United States Patent
Liu et al.

(10) Patent No.: US 12,802,099 B2
(45) **Date of Patent: *Nov. 17, 2026**

(54) TRACKING ADVERTISEMENTS USING A SINGLE URL WITHOUT REDIRECTION

(71) Applicant: eBay Inc., San Jose, CA (US)

(72) Inventors: Yi Liu, Shanghai (CN); Pramod Mamidipudi, Sunnyvale, CA (US); Xiang Li, Shanghai (CN); Lei Li, Shanghai (CN); Bin Li, Shanghai (CN)

(73) Assignee: eBay Inc., San Jose, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/204,833

(22) Filed: Jun. 1, 2023

(65) Prior Publication Data

US 2023/0306462 A1 Sep. 28, 2023

Related U.S. Application Data

(63) Continuation of application No. 17/668,178, filed on Feb. 9, 2022, now Pat. No. 11,704,690, which is a continuation of application No. 16/952,920, filed on Nov. 19, 2020, now Pat. No. 11,282,107.

(51) Int. Cl.

| | |
|---|---|
| ***G06Q 30/0242*** | (2023.01) |
| ***G06F 16/953*** | (2019.01) |
| ***G06F 16/955*** | (2019.01) |
| ***G06F 16/957*** | (2019.01) |
| ***G06F 16/958*** | (2019.01) |
| ***G06Q 30/0241*** | (2023.01) |

(52) U.S. Cl.
CPC ....... *G06Q 30/0246* (2013.01); *G06F 16/953* (2019.01); *G06F 16/9566* (2019.01); *G06F 16/9577* (2019.01); *G06F 16/958* (2019.01); *G06Q 30/0277* (2013.01)

(58) Field of Classification Search
CPC . G06Q 10/063; G06Q 30/0255; G06F 16/951
See application file for complete search history.

(56) References Cited

U.S. PATENT DOCUMENTS

| | | | | |
|---|---|---|---|---|
| 9,219,787 | B1 | 12/2015 | Manion et al. | |
| 9,330,258 | B1 | 5/2016 | Satish et al. | |
| 9,553,918 | B1 | 1/2017 | Manion et al. | |
| 10,262,342 | B2 | 4/2019 | Nath et al. | |
| 10,521,827 | B2 | 12/2019 | Douglas et al. | |
| 10,534,851 | B1 * | 1/2020 | Chan .................. | G06Q 30/0255 |
| 11,282,107 | B1 | 3/2022 | Liu et al. | |

(Continued)

*Primary Examiner* — Saba Dagnew
(74) *Attorney, Agent, or Firm* — Shook Hardy & Bacon L.L.P.

(57) ABSTRACT

Methods, systems, and computer storage media are provided for tracking an advertisement using a single URL without redirection. When an ad event is received on a client-computing device, a single URL is determined to provide content for the item and to track the ad event, the URL identifying a domain server. A parameter related to the ad event is determined and encoded as a part of the URL or as a HTTP header. The URL is called, causing the domain server to extract the parameter from the URL or the HTTP header and asynchronously request tracking of the ad event. Additionally, the content for the item is received from the domain server.

20 Claims, 6 Drawing Sheets

(56) References Cited

U.S. PATENT DOCUMENTS

| | | | | |
|---|---|---|---|---|
| 11,704,690 | B2 | 7/2023 | Liu et al. | |
| 2002/0103823 | A1* | 8/2002 | Jackson | G06F 16/951 715/236 |
| 2011/0191185 | A1* | 8/2011 | Schroeder | G06F 16/29 707/769 |
| 2011/0191664 | A1 | 8/2011 | Sheleheda et al. | |
| 2011/0208850 | A1 | 8/2011 | Sheleheda et al. | |
| 2012/0166267 | A1 | 6/2012 | Beatty et al. | |
| 2012/0174236 | A1 | 7/2012 | Goodwin et al. | |
| 2013/0159233 | A1* | 6/2013 | Mason | G06Q 50/01 706/45 |
| 2015/0025981 | A1 | 1/2015 | Zaretsky et al. | |
| 2016/0042388 | A1* | 2/2016 | Chater | H04L 67/535 705/14.45 |
| 2017/0180229 | A1* | 6/2017 | Toksoz | G06Q 10/063 |
| 2018/0159840 | A1 | 6/2018 | Hau et al. | |
| 2018/0300767 | A1 | 10/2018 | Zaretsky et al. | |
| 2021/0019806 | A1 | 1/2021 | Galopo et al. | |
| 2021/0374038 | A1 | 12/2021 | Robinson et al. | |
| 2022/0270131 | A1 | 8/2022 | Liu et al. | |

* cited by examiner

TRACKING ADVERTISEMENTS USING A SINGLE URL WITHOUT REDIRECTION

CROSS-REFERENCE TO RELATED APPLICATIONS

This patent application is a continuation of U.S. patent application Ser. No. 17/668,178, filed Feb. 9, 2022, which is a continuation of U.S. patent application Ser. No. 16/952,920, filed Nov. 19, 2020 (issued as U.S. Pat. No. 11,282,107). Each of the aforementioned is incorporated herein by reference in its entirety.

BACKGROUND

Conventional links, such as Uniform Resource Locators ("URLs"), associated with advertisements often use a series of redirection links, or URL calls, pertaining solely to tracking the context of an advertisement before presenting a final page regarding an advertised item to a user. The redirection links, which are used to provide and track context regarding the advertisement, redirect the browser every time a link is called. Each redirection is noticeable and can cause considerable delays between when a user clicks on an advertisement and when the user actually views content related to the advertisement. Additionally, the redirection links provide the public with visibility into information sent between the browser and an advertiser's domain server. For instance, in conventional systems, the redirection links provide a disruptive and disjointed user experience, while also presenting an opportunity to malicious users to decipher the tracking information and hijack the system in their favor.

Each time a redirection link is called, the user is able to view the new link being called in the browser address bar even though the relevant information about the advertised item has yet to be displayed. This disruptive experience is repeated for each and every redirection link. In the hands of malicious users, however, these redirection links may be mined for tracking information to artificially inflate credit for advertisements to the malicious users. These issues are only compounded when a high number of redirection links are used to facilitate tracking of an advertisement. This inefficient way of tracking advertisements increases the time it takes a user to view an advertisement landing page, disrupts the user's overall experience, and exposes crucial tracking metrics that determine payment to advertisement publishers to the public.

SUMMARY

At a high level, aspects described herein relate to generating a single URL to direct a user to a landing page and asynchronously tracking an advertisement event. By generating a single URL that does not set off a series of redirection links and tracking advertisements through augmented URL calls and Hypertext Transfer Protocol ("HTTP") headers, context of an advertisement may be tracked without disrupting a user's experience on a website or application.

When an advertisement event is received, a single URL may be dynamically generated to include details regarding the advertisement event, the advertisement, and/or the tracking of that advertisement. A set of HTTP headers, which may also include details regarding the advertisement event, the advertisement, and/or the tracking of that advertisement, may also be generated. Once generated, the URL and HTTP headers may be sent from a client-computing device to a domain server to request landing page content associated with the advertisement.

In response to the URL call, landing page content may be transmitted to the client-computing device. In some aspects, the landing page content, which may be displayed via browser or application, may include embedded middleware or software that generates additional URL calls and HTTP headers pertaining to tracking of an advertisement based on it context.

Additionally, in response to receiving a URL call and HTTP headers from the client-computing device, the URL may be parsed into parameters. The HTTP headers may also be similarly parsed into individual HTTP headers or parameters. Based on the parsed information, metadata and user information relevant to the URL call and HTTP headers may be retrieved. The metadata and user information may be used to generate URL parameters and HTTP headers that may be appended onto the received URL and HTTP headers, respectively. Once the augmented URL and HTTP headers have been generated, they may be sent to a tracking service to record and log information regarding the context of the advertisement. In some aspects, the URL and HTTP headers sent to the tracking service describe information that determines whether an advertisement publisher should be associated with the advertisement and/or compensated for publishing the advertisement based on the advertisement context.

As the user continues to engage with the landing page content, the embedded middleware may continue to track the user's interactions, generate URLs and HTTP headers pertaining to those interactions, and transmit those URLs and HTTP headers to be processed and tracked. The received URL calls and HTTP headers from the middleware may be augmented with additional metadata and user information in the form of appended URL parameters and HTTP headers, as described above, to continue to track the advertisement context.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing FIGURES, wherein.

DETAILED DESCRIPTION

Figure 1:
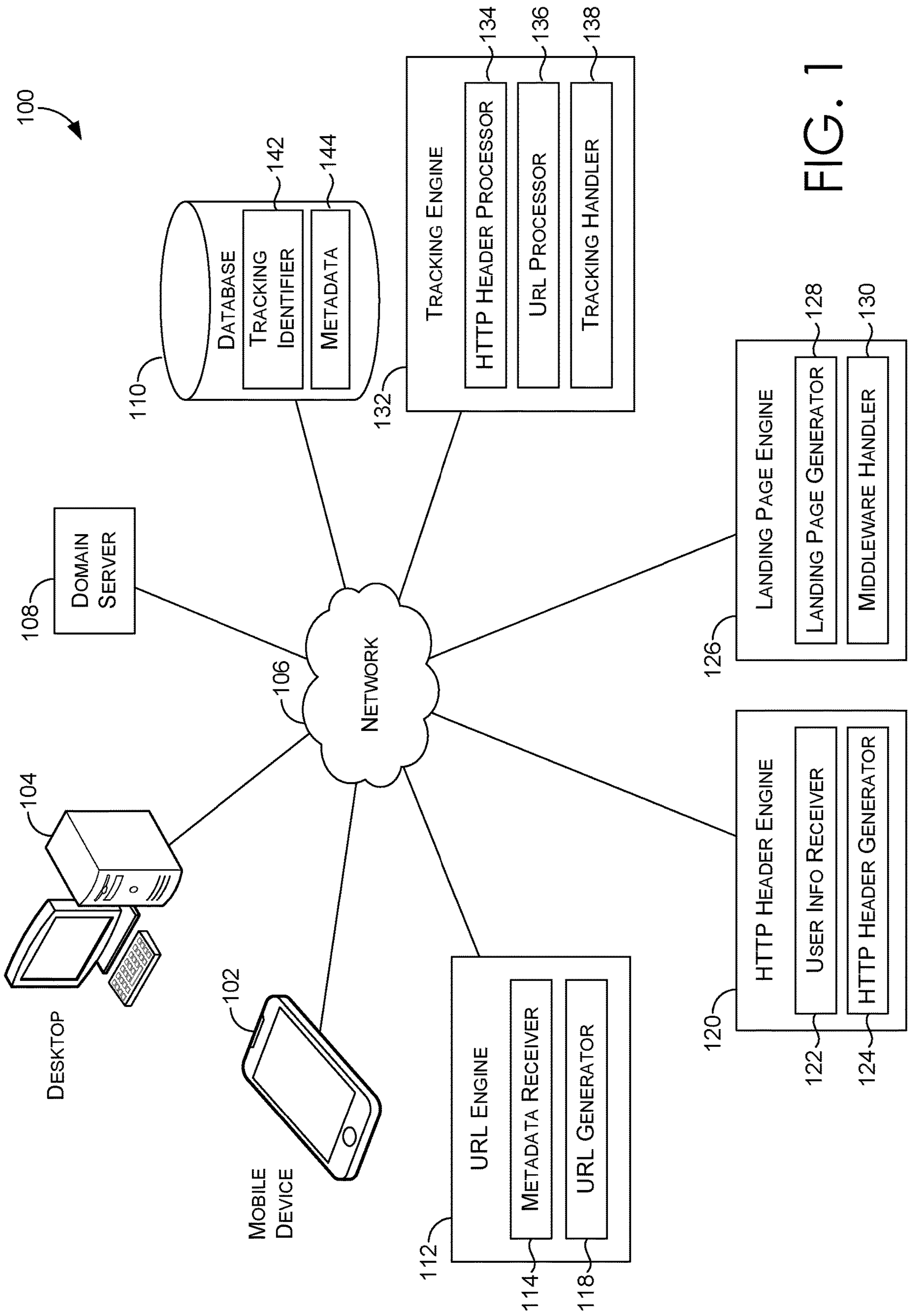
FIG. 1 is an example advertisement tracking system in which implementations of the present disclosure may be employed.

As described above, conventional advertisement systems use multiple URL calls, involving redirection, to track an advertisement. Often times, the use of multiple redirection links between the user clicking on an advertisement and viewing content regarding the advertised item causes a disruptive experience that is compounded for each additional redirection link used. The redirection links, which may contain confidential or sensitive information to track the advertisement event, also expose details to the public regarding how an advertisement is tracked. These conventional systems, however, have particular shortcomings that stem from tracking an advertisement through multiple, redirecting URL calls each time an advertisement needs to be tracked.

In one example, conventional advertisement tracking systems receive an advertisement event, which may be triggered by a user clicking on an advertisement, and transmit a series of URL calls. The URL calls of redirection links, which may be performed in succession, provide tracking information to a domain server using URL parameters. For example, an initial URL call may be sent to a tracking service of the publisher and the call may specify details regarding an advertisement event, such as whether an advertised item was purchased by the user. Additional redirection URL calls may be sent to the tracking service to provide more tracking information about the advertisement. As these redirecting URL links are called, the user may visibly see the browser address bar cycling through multiple URLs without any content regarding the advertised item being presented. Likewise, a savvy or malicious user may be able to capture each redirection URL call, parse the parameters, manufacture URLs to their benefit, and intentionally initiate URL calls to the tracking service to gain more payment. The last URL call, after the multiple cycles of redirection links, however, may be landing page content pertaining to the advertised item. For instance, the last URL may be transmitted to a domain server of an advertiser to request final landing page content related to the advertised item. With the landing page content received from the domain server, the browser or application may display the content pertaining to the advertised item to the user. Ultimately, this system of redirection links creates particular challenges for advertising systems because each redirection URL is time-consuming, disrupts the user experience, causes poor network performance, and allows the public to view tracking information that may be used for malicious purposes. This problem is compounded when numerous redirection links are used to track advertisement context as each redirection link is associated with a high time commitment with little reward for the user experience.

The time-consuming nature of redirection links makes it difficult to provide a rich set of data to track an advertisement event without significant losses with respect to placing profitable content in front of the user in as little time as possible. Likewise, the high visibility of the content of URL calls is in conflict with the need for a large volume of tracking data and the ease with which tracking information can be passed through URL links. To maximize the user's experience with content put forth by an advertiser and to secure the metrics used for tracking a successful advertisement, it is essential that the number of redirection links be reduced and that the values used to track advertisement context be obfuscated from the user.

To lessen these problems, the technology described herein provides a tracking engine that receives a single URL call requesting landing page content and effectively tracks context of the advertisement using additional URL calls and HTTP headers. Additionally, middleware or software embedded in the landing page content may continue to send URL calls and HTTP headers regarding context of the advertisement. Metadata associated with the context of the advertisement may then be appended to received URL call and HTTP headers to provide a data-intensive URL and information-heavy HTTP headers to transmit to internal tracking services, allowing sensitive information regarding tracking to be transmitted and received internally while directing users to landing page content as quickly as possible without disrupting the user experience.

One example method for achieving these advantages and improvements begins by receiving a URL call, which may be dynamically generated, at a domain server for landing page content. In response to the request, the domain server may transmit landing page content embedded with middleware from the landing page engine and transmit the content to a client-computing device. In this way, the user is immediately directed to a landing page regarding an advertised item without the disruption of redirection URL calls. In some aspects, the middleware embedded in the landing page may transmit additional URL calls accompanied by HTTP headers that include details regarding context of the advertisement.

The received URL call and HTTP headers from the client-computing device are parsed by the tracking engine. The tracking engine may also retrieve metadata regarding the advertisement context, such as information regarding the user that triggered the advertisement event. With the relevant metadata retrieved, the tracking engine may route the received URL and HTTP headers along with the metadata to the URL and HTTP header engines.

Once the metadata and user information has been received, the URL and HTTP header engines may encode the information to be appended to the received URL and HTTP headers. For example, a URL parameter and HTTP header pertaining to the username of the user that triggered the advertisement event may be generated. The generated URL parameter may be appended to the received URL and the generated HTTP header is similarly appended to the preexisting set of HTTP headers. In this way, the preexisting URL and HTTP headers are leveraged and enriched with the addition of other relevant metadata and user information to be used by the tracking service.

Once the augmented URL and HTTP headers have been generated, they may be routed to the tracking engine. The tracking engine may transmit the URL and HTTP headers to a tracking service that tracks, records, and logs details regarding the advertisement context as parsed from the augmented URL and HTTP headers. As a user continues to engage with the landing page content, the embedded middleware may generate URL calls and HTTP headers and transmit them to the tracking engine. The URL calls and HTTP headers received from the embedded middleware once again go through the process of being augmented with additional metadata to provide a comprehensive source of tracking information to the tracking service.

Because tracking of an advertisement event is performed using one URL call, users are directed to landing page content without redirection links, tracking methodology is kept internal and away from the public, the time it takes to present a user with landing page content is reduced, and comprehensive tracking information is sent to an internal tracking service. Whereas conventional systems require at least two URL calls or redirection links to track each and every advertisement event, the technology described herein uses only one URL call to track an advertisement, while still providing a high-quality user experience and data-intensive tracking information.

The method previously discussed is only one example that can be performed using the technology described herein. This and other examples will be realized using the technology provided by the drawings, which are referenced now to provide further detail.

Turning now to FIG. 1, FIG. 1 illustrates example advertisement tracking system operating environment 100 in which implementations of the present disclosure may be employed. In particular, FIG. 1 illustrates a high-level architecture of advertisement tracking system operating environment 100 having components in accordance with implementations of the present disclosure. The components and architecture of FIG. 1 are intended as examples, as noted toward the end of Detailed Description.

Among other components or engines not shown, advertisement tracking system operating environment 100 includes client-computing devices 102 and 104. Client-computing devices 102 and 104 are shown communicating using network 106 to domain server 108. URL engine 112, HTTP header engine 120, landing page engine 126, and tracking engine 132 are also shown communicating using network 106 to domain server 108, database 110, and client-computing devices 102 and 104. The components of advertisement tracking system operating environment 100 may communicate with each other over one or more networks (e.g., public network or virtual private network "VPN") as shown with network 106.

The components of advertisement tracking system operating environment 100 can operate together to provide functionality for generating Uniform Resource Locators ("URLs") and Hypertext Transfer Protocol ("HTTP") headers to process advertisement events without redirection links and track advertisement events, examples of which will be further described. Advertisement tracking system operating environment 100 supports processing user input from client-computing devices 102 and 104. In particular, client-computing devices 102 and 104 may receive user input, such as a user clicking on an advertisement published by a publisher on behalf of the advertiser, that leads to advertisement events, collect user information such as device identifiers or user browsing history stored on a cookie, and communicate that information to landing page engine 126 and tracking engine 132. Client-computing devices 102 and 104 may also dynamically generate a single URL without redirection links in response to an advertisement event and transmit a URL call and HTTP headers, in response to advertisement events, to tracking engine 132 via domain server 108 for processing and tracking of advertisement context. Landing page engine 126 may generate landing page content, receive URL calls and HTTP headers from middleware embedded in the landing page, route received URL calls and HTTP headers to tracking engine 132 for additional processing and tracking. Tracking engine 132 may operate with URL engine 112 and HTTP header engine 120 to generate a URL and a set of HTTP headers, based on received URL calls and HTTP headers, to send to a tracking service to track and log advertisement context. URL engine 112 may operate with database 110 to generate additional URL parameters. HTTP header engine 120 may operate with tracking engine 132 to gather user information and generate additional HTTP headers. Tracking engine 132 may compile the generated URL and HTTP headers to send to a tracking service that logs tracking information in database 110. Client-computing devices 102 and 104 may also operate with landing page engine 126 and domain server 108 to receive landing page content, including embedded software (e.g., middleware), and cause the display of, all or a portion of, landing page content (provided as HTML code or otherwise) corresponding to an advertisement event through graphical user interfaces such as web browsers and/or mobile applications.

Network 106 may include, without limitation, one or more local area networks (LANs) wide area networks (WANs), or any other communication network or method. Client-computing devices 102 and 104 may be client-computing devices that correspond to the computing device described herein with reference to FIG. 6. In some aspects, client-computing devices 102 and 104 may present landing page content, which may include embedded middleware, in a web browser or application.

Domain server 108 is generally a computing device that includes at least one process and accompanying memory. Domain server 108 may provide webpage or application content in response to calls (e.g., URL and HTTP POST calls) by client devices, such as client-computing devices 102 and 104. The calls from client-computing devices 102 and 104 may include a call or request specifies a server within a particular domain should be called. For instance, a URL containing the domain "eBay" may result in the URL call being routed to an eBay domain server. In some aspects, in response to the calls from client-computing devices 102 and 104, the domain server 108 may generate and transmit webpage and application content, such as landing page content. In some aspects, domain server 108 may operate with one or more application servers (not shown) to service and filter through calls from client-computing devices 102 and 104. Additionally, the domain server 108 may also operate with publisher servers (not shown) to publish an advertisement and receive advertisement events.

A URL is a web address that specifies the location of web resources requested by a user via a URL call. URL calls (e.g., a user has entered a URL and requested the web resource at the URL location) may be received from a user via client-computing devices 102 and 104. URLs may include a server name, such as the name of a domain server that hosts a requested web resource and/or the name of an application server that processes the URL call, and parameters that are related to the URL call. In some aspects, the parameters in the URL may form the query string portion of a URL and are each separated by syntax such as slashes and ampersands.

A HTTP header is information that accompanies a HTTP request or URL call to facilitate the exchange of information between the client-computing devices 102 and 104 and servers, such as domain server 108. For instance, HTTP headers may include information such as language of the content, Internet Protocol ("IP") address of the client-computing devices 102 and 104 sending the HTTP header, cookies from a user's device, and information regarding the referring website. In some aspects, HTTP headers may include headers that have been generated for internal use by servers, such as the domain server 108 or other application servers (not shown).

A parameter (also referred to as "query parameter" or "URL parameter") is a value in a URL or HTTP header. With respect to URLs, a parameter has a parameter name and a parameter value, both of which exist within the query string portion of a URL. Parameters provided within a URL may include information that is used by the domain server 108 and application servers (not shown) to process a URL call. Parameters for URLs may include a location of a client-computing device, an identifier of a source application, and/or an identifier of an advertisement campaign. For instance, parameters included in a URL call may be used to track an advertisement event by the domain server 108. For example, if a user clicked on an item relating to a holiday, the URL may include a parameter name such as "productTheme" that specifies that the parameter relates to the category of products the item falls under, with a parameter value of "holiday" to illustrate that the item is categorized as a holiday item. The parameter as a whole may then be used internally by the domain server 108 and application servers (not shown) to track the sale or interest in items related to the holidays. With respect to HTTP headers, a parameter may be a HTTP header, which has a HTTP header type and a corresponding value. In some aspects, parameters for HTTP headers may include a referrer website and/or an IP address. For example, a HTTP header type may be "referrer," which denotes the website prior to the advertisement being clicked on, and may have a value of "www.AdPublisher.com." The parameter as a whole may then be used to associate the advertisement context with an advertisement publisher.

An advertisement event is a user interaction or user input pertaining to a posted advertisement. The advertisement events relates to one or more products and/or services sold by an advertiser and may encompass the user's initial click of the advertisement through the purchase, or conversion, of the item. In some aspects, an advertisement is initially posted by a publisher and the publisher initiates a URL call to the domain server 108 once a user clicks on the advertisement. In the instance where a publisher is used to publish the advertisement, the advertisement event is credited to the publisher. An advertisement event may be triggered through any method of user interaction including via interfaces such as web browsers, applications, and email clients.

Advertisement context is any information relating to the advertisement, a user that triggered an advertisement event, and/or a client-computing device that displayed the associated advertisement. The advertisement context may provide information that can be used to determine metrics regarding the relative success of an advertisement event. For instance, the advertisement context may be analyzed to determine whether between two advertisements, which both advertise the same item, one advertisement results in more sales of the item than the other.

Landing page content, which is generated in response to a URL call from client-computing devices 102 and 104, may include information about an advertised item. In some aspects, the landing page content includes code (e.g., HTML, Swift, Java) to render a website or application page as hosted by the advertiser. For instance, if a user clicks on an advertisement for eBay posted by a publisher then the landing page content sent in response may include an eBay webpage or application page that relates to the item being advertised. In some aspects, the landing page content, as presented via a web browser or application, may also include embedded middleware that captures additional information that can be used to track the advertisement, such as at what times and where a user clicks on the landing page, and sends the information to tracking engine 132.

User input, for example, may be any action provided by a user. For instance, the user input may include a mouse click or movement, pressure applied to a touch-screen interface, movement along a smart pad, or any other interaction with device or sensor for receiving and communicating a user action.

A "user" may broadly include any identifiable origin of information. For example, a user may include a person using a computing device, such as client-computing devices 102 and 104. A user may include client-computing devices 102 and 104, themselves. In another example, a user may include the network over which client-computing devices 102 and 104 communicate, such as one identified by an IP address.

Figure 6:
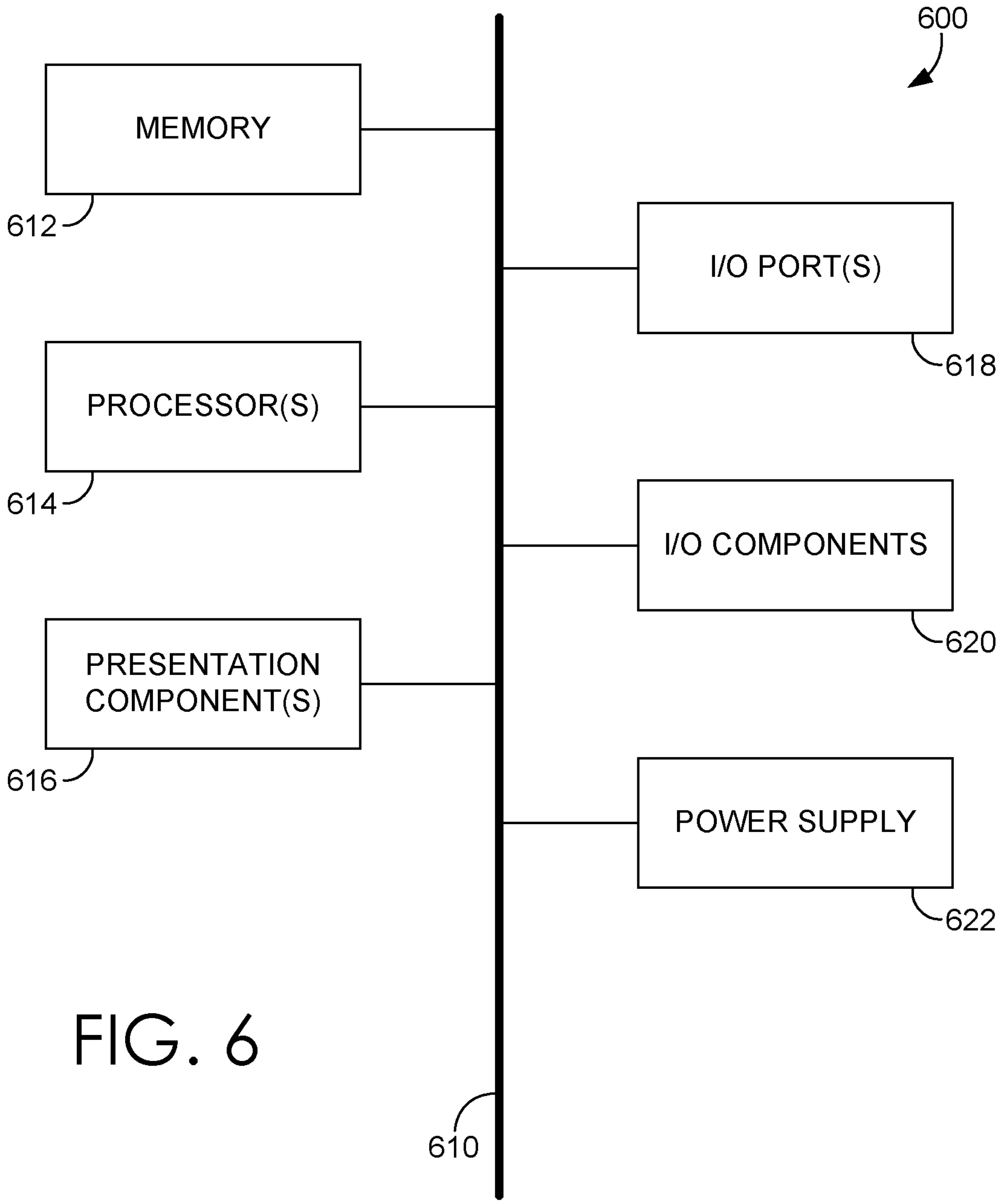
FIG. 6 is a block diagram of an example computing environment suitable for use in implementing aspects described herein.

Database 110 generally stores information including data, computer instructions (e.g., software program instructions, routines, or services), or models used in embodiments of the technical solutions. Although depicted as a database component, database 110 may be embodied as one or more data stores or may be in the cloud. Memory 612 of FIG. 6 is an example suitable for use as database 110. Database 110 stores, among other things, tracking identifier 142 and metadata 144. Tracking identifier 142 includes unique identifiers that correspond to advertisements and are used to track advertisements. Metadata 144 includes information regarding the advertisement, user, user's device, and user's account with an advertiser. For example, metadata 144 may include information regarding the purpose of the advertisement, such as the audience and/or country that the advertisement was made for. Similarly, the metadata 144 may include information regarding the publisher of the advertisement. Metadata 144 may also include cookie data stored on client-computing devices 102 and 104 that is sent along with the URL call and/or HTTP headers. For instance, the cookie data may include information that can be traced back to a specific user's account and associated metadata (e.g., a user identifier associated with the advertiser that is stored in a cookie on client-computing devices 102 and 104).

URL engine 112 is illustrated as including metadata receiver 114 and URL generator 118.

URL engine 112 may receive metadata, user information, and URL parameters regarding an advertisement to dynamically generate URLs. URL engine 112 may receive requests to generate URLs in response to an advertisement event as well as requests to augment URLs to include information used for internal tracking purposes.

Metadata receiver 114 receives and formats metadata into URL parameters each time (1) a request to generate a new URL is received, and (2) each time associated metadata needs to be appended to a preexisting URL for tracking purposes.

Metadata receiver 114 may generate, in response to a request to dynamically generate a URL in response to an advertisement event, URL parameters to include in a single URL that directs a user to a landing page for an item and asynchronously tracks the advertisement event using advertisement context. For instance, after a user clicks on an advertisement, the client-computing devices 102 or 104 (via a browser or application) may request a URL for the advertised item. In response, metadata receiver 114 collects metadata 144 corresponding to the advertised item, such as a publisher associated with the advertisement and the audience that the advertisement is targeting, and formats the metadata to appear as parameters in a URL. In some aspects, the metadata receiver 114 dynamically generates the URL using a client-side script. For example, the browser or application on client-computing devices may have a client-side script (e.g., HTML, Java, Swift) that dynamically generates the URL. In some aspects, the client-side script may reside within middleware embedded in the landing page content. In some aspects, the URL may be dynamically generated by a publisher of the advertisement using a template URL and parameter values provided by the advertiser.

Metadata receiver 114 may generate a variety of URL parameters that are related to the advertisement context. For instance, in response to a request to generate a URL, metadata receiver 114 may generate URL parameters using metadata 144 that relate to the advertisement itself. For example, a parameter may relate to the publisher of the advertisement. In some aspects, metadata receiver 114 generates URL parameters directed the tracking of the advertisement event. For example, metadata receiver 114 may generate parameters relating to the success of the advertisement campaign and/or a channel through which the advertisement is being presented. As shown in Table 1 below, there are several parameters that may be generated by metadata receiver 114.

TABLE 1

| Description of parameter | Parameter name |
|---|---|
| Describes where the advertisement was presented | channel |
| Describes an organized advertising campaign strategy that an advertised item is part of (e.g., holiday, kitchenware) | adGroup |
| Describes the country being targeted as the audience for an advertisement | audience |
| Describes a unique identifier that can be mapped to a particular advertisement campaign, partner identifier, country, and/or advertisement accounts | uniqueID |
| Describes the efficacy of the advertising strategy | success |
| Describes a tracking identifier to track each advertisement | trackingID |
| Describes a tracking identifier for advertisements | identifier |
| Describes where an advertisement is placed | placement |
| Describes how an advertisement is positioned | position |

Figure 2:
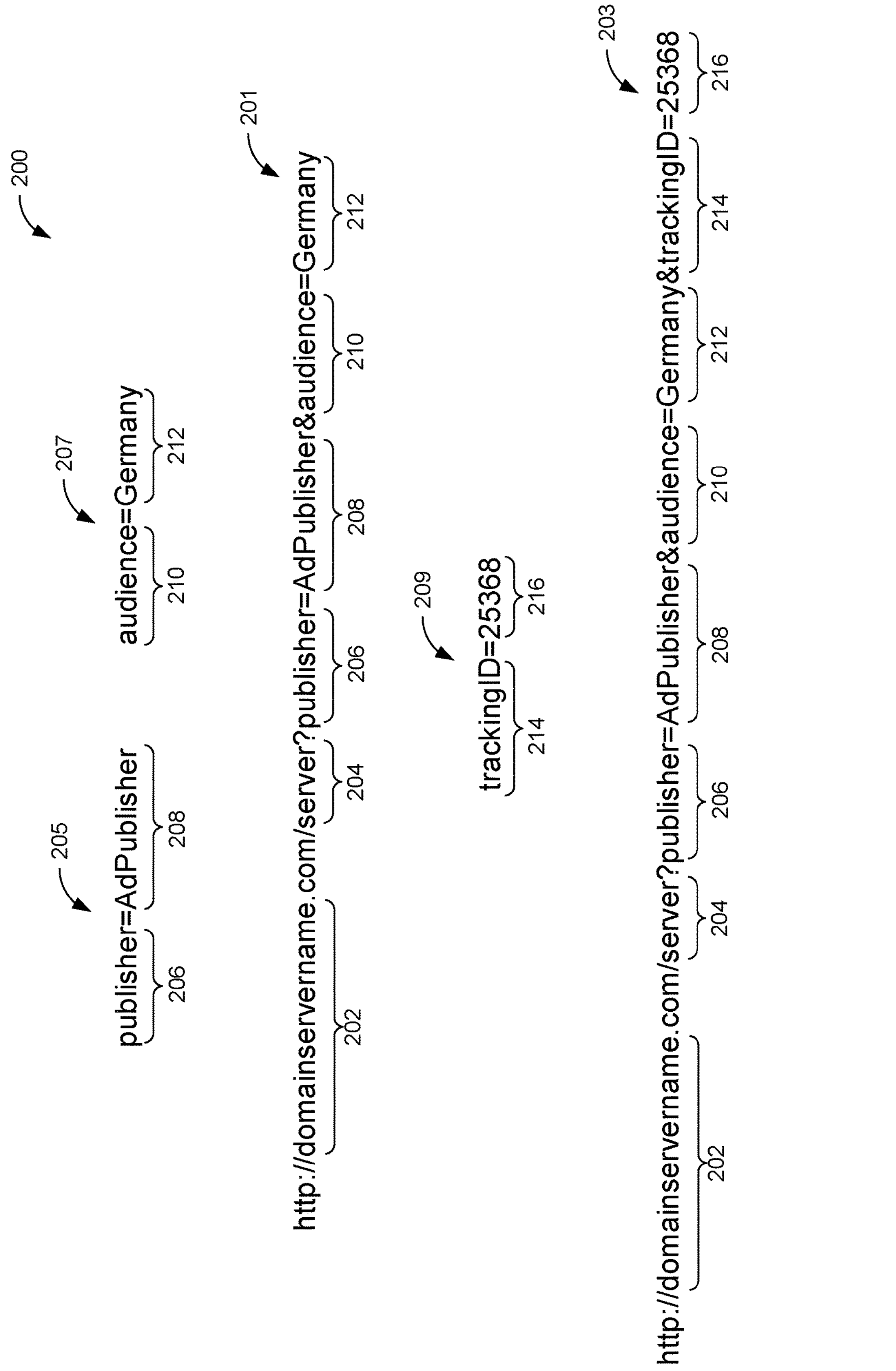
FIG. 2 is an example of two URLs that include multiple query parameters, in accordance with aspects described herein.

Turning briefly to FIG. 2, example URLs 200 are provided. In this example, metadata receiver 114 received a request to generate a new URL and, in response, retrieved metadata 144 regarding the context of an advertisement such as the publisher of an advertisement and the country that the advertisement is targeting (e.g., Germany). Using the request to generate a URL and the retrieved metadata, metadata receiver 114 generates parameters 205 and 207 that include the proper encoding of the parameters. For instance, the parameter name for the advertisement publisher, as recognized by a tracking service, is "publisher," as shown by parameter name 206, and the recognized value of the publisher is "AdPublisher," as shown by value 208. Metadata receiver 114 formats parameter 205 such that parameter name 206 and parameter value 208 are separated by the syntax of an equals sign ("="). Likewise, metadata receiver 114 formats the parameter 207, which describes the country that the advertisement is targeting, to have parameter name 210 (e.g., "audience") and parameter value 212 (e.g., "Germany") using terms and encoding that the tracking service would be able to parse and log. The tracking service may then log the advertisement as being associated with the publisher AdPublisher.

Turning back to FIG. 1, metadata receiver 114 may receive metadata 144, from URL processor 136, to be appended as a query parameter to a preexisting URL for tracking purposes. In some aspects, the URL processor 136 received a URL call from client-computing devices 102 and 104, determined additional metadata to append to the received URL, and transmitted the original URL and associated metadata to metadata receiver 114 to generate an augmented URL. Using the received URL and additional metadata 144, metadata receiver 114 may convert the metadata 144 into parameters that may be appended to a preexisting URL for tracking purposes. For instance, metadata receiver 114 may receive metadata 144 such as a tracking identifier (e.g., 2343234) that needs to be appended to a URL. Metadata receiver 114 may then encode the tracking identifier to follow the format specified (e.g., trackingID=2343234) that can then be appended to a URL.

Briefly referencing FIG. 2, metadata receiver 114 received a preexisting URL, URL 201, along with metadata 144 pertaining to a tracking identifier relating to an advertisement. Using the metadata 44, metadata receiver 114 generates parameter 209 that has parameter name 214, "trackingID," and parameter value 216, "25368." This parameter may be appended to URL 201 to augment the received URL call information with additional tracking information.

Turning back to FIG. 1, URL generator 118 may receive URL parameters from metadata receiver 114 and generate URLs. URL generator 118 may generate URLs (1) when a request to generate a URL in response to an advertisement event is received, and (2) when a request to append parameters to a preexisting URL is received.

After receiving URL parameters from metadata receiver 114, URL generator 118 may formulate a URL with appropriate syntax to separate URL parameters to direct a user to a landing page while also initiating a tracking process asynchronously. In some aspects, URL generator 118 selects a domain name for the URL that will direct a user to a landing page without redirection. For instance, URL generator 118 may select a domain name that is associated with the advertiser. For example, if the advertiser is eBay, then URL generator 118 may select a domain name for the URL that includes the eBay domain name. Likewise, URL generator 118 may select additional server names that specify the server that a call including the generated URL should be routed to. Once the base of the URL is formed (e.g., domain server name and/or names of other servers), the URL generator 118 may append, using appropriate syntax, URL parameters received from metadata receiver 114 to the base of the URL.

In response to receiving a request to append URL parameters to a preexisting URL for tracking purposes, URL generator 118 may receive URL parameters from metadata receiver 114 and append those parameters to a preexisting URL using appropriate syntax. For instance, if URL parameters are separated by ampersands, URL generator 118 may insert additional ampersands between URL parameters at the end of the preexisting URL. In some aspects, the augmented URL is then sent to tracking engine 132 to forward the augmented URL to a tracking service for further processing such as logging information regarding the advertisement.

Turning to FIG. 2, URL generator 118 generates URL 201 using parameters 205 and 207 from metadata receiver 114. URL generator 118 selects a domain server name 202 that is within the domain of the advertiser. URL generator 118 also selects a server name 204 that specifies where the URL call should be processed internally using other servers associated with the advertiser. With the domain server name 202 and additional server name 204 serving as the base of the URL, URL generator 118 appends received parameters 205 and 207 to the base of the URL with appropriate syntax between the server names and parameters to form URL 201. When URL 201 is called by a client-computing device, URL generator receives a request to append another parameter, parameter 209 pertaining to the tracking identifier of an advertisement generated by metadata receiver 114, to URL 201. Using parameter 209 and appropriate syntax, URL generator 118 adds parameter 209 to the end of URL 201 to generate URL 203. URL generator 118 may then send the URL 203, which now includes a comprehensive set of data to internally track an advertisement, to tracking engine 132 to forward to a tracking service.

Returning to FIG. 1, HTTP header engine 120 is illustrated as including user information receiver 122 and HTTP header generator 124.

HTTP header engine 120 may receive metadata and user information regarding an advertisement event in order to dynamically generate HTTP headers. HTTP header engine 120 may receive requests to generate HTTP headers with respect to an advertisement event as well as requests to augment HTTP headers to include additional tracking information to be used by an internal tracking service.

User information receiver 122 may receive a request to generate one or more HTTP headers with respect to an advertisement event. In response to the advertisement event, user information receiver 122 may collect user information along with metadata 144 to encode into HTTP headers. For instance, after a user clicks on an advertisement, user information receiver 122 may collect information regarding the advertisement event, such as the referring website that preceded the user's click on the advertisement. In some aspects, user information receiver 122 may select metadata 144 regarding tracking the advertisement event (e.g., an identifier associated with the user that triggered the advertisement event). With the collected metadata 144 and user information, user information receiver 122 encodes the information into HTTP header format. In some aspects, user information receiver 122 dynamically generates HTTP headers using a script (e.g., HTML, Java, Swift) present on the client-side of the transaction, such as client-computing devices 102 and 104. For instance, the browser or application on client-computing devices 102 and 104 may have a client-side script that dynamically generates HTTP headers. In some aspects, the client-side script may also be a part of middleware embedded in the landing page content.

User information receiver 122 may generate HTTP headers that are related to different aspects of an advertisement context, including the advertisement event itself as well as tracking of the advertisement event. In some aspects, user information receiver 122 may generate parameters relating to the best guess of an identifier corresponding to a user and/or a tracking identifier for the advertisement. In some aspects, the HTTP headers may relate to characteristics of the user, including whether the user is a human or a robot. Table 2 below illustrates example HTTP headers that may be generated by user information receiver 122 using metadata and user information.

TABLE 2

| Description of HTTP header | HTTP header name |
|---|---|
| Describes a Globally Unique Identifier ("GUID") that is used to track an advertisement | GUID |
| Describes a user identifier that is used to track an advertisement | userID |
| Describes the best guess at a corresponding user identifier or username for an advertisement event | guessUserID |
| Describes the website or link that preceded an advertisement event | referrer |
| Describes whether the click on the advertisement was performed by a human or a bot | eventAgent |
| Describes IP address of a user device, location of the user device, and/or language used on the user device | deviceInfo |

Figure 3:
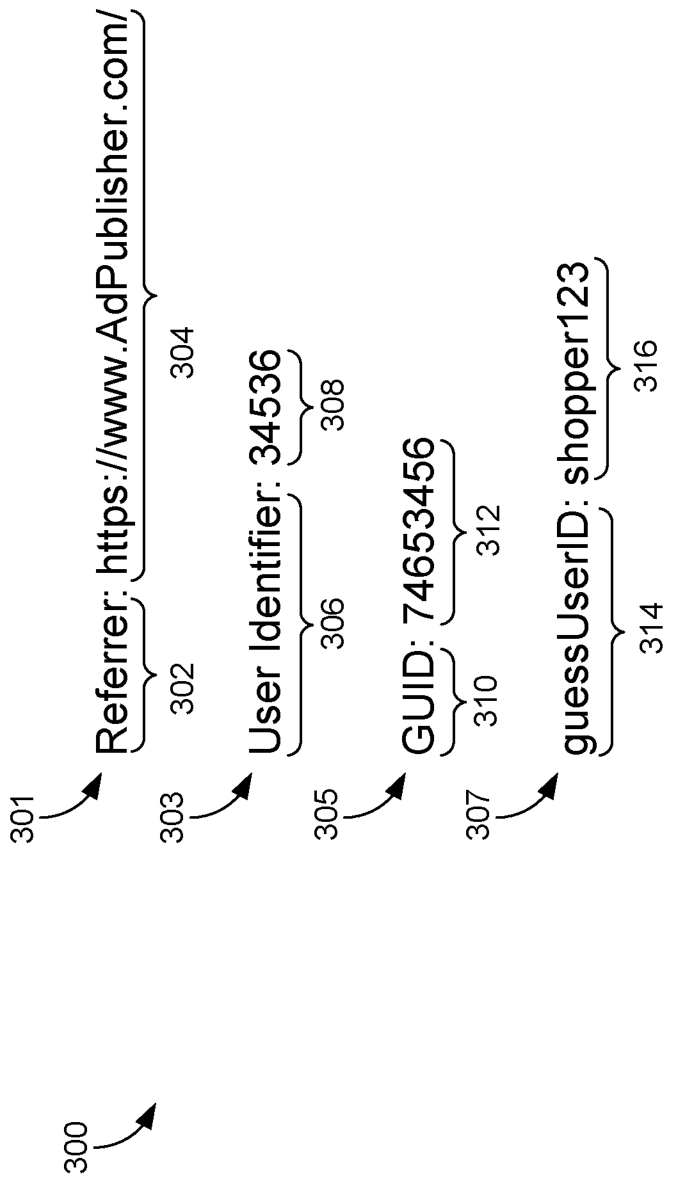
FIG. 3 is an example of three HTTP headers, in accordance with aspects described herein.

Turning briefly to FIG. 3, example HTTP headers 300 are provided. For the purposes of this example, user information receiver 122 received a request to generate a set of HTTP headers with respect to an advertisement event. In response, user information receiver 122 retrieved a referring website and encoded the information into HTTP header 301 with header type 302 and header value 304. In this example, the header type 302 is "referrer" and the value 304 is website that preceded the advertisement event, "https://www.Ad-Publisher.com." Both header type 302 and value 304 are encoded such that a tracking service may parse out the values and log them.

Referring back to FIG. 1, user information receiver 122 may receive user information and metadata 144 from HTTP header processor 134, and a request to append that received information as HTTP headers to a preexisting set of HTTP headers. The additional HTTP headers may be used for tracking purposes to determine the success of the advertisement and to analyze the circumstances around an advertisement event. In some aspects, the HTTP header processor 134 received a set of HTTP headers accompanying a URL call from client-computing devices 102 and 104, and determined additional metadata 144 and user information to append in the form of HTTP headers. The preexisting HTTP headers and additional metadata 144 are then sent to HTTP header engine 120 to generate an augmented set of HTTP headers. Based on the preexisting HTTP headers and received metadata 144, user information receiver 122 may encode the metadata 144 into HTTP headers that may be added to a set of preexisting HTTP headers for tracking purposes. For example, user information receiver 122 may receive information such as a user identifier that needs to be included in an augmented version of the preexisting HTTP headers from HTTP header processor 134. Once the metadata 144 is received, user information receiver 122 may encode the user identifier to follow standard HTTP formatting syntax, such as placing a colon between the header type and value.

Briefly referencing FIG. 3, user information receiver 122 received HTTP header 301, which was sent along with a URL call by client-computing devices 102 and 104, in addition to metadata 144 regarding a user identifier, globally unique identifier, and an estimated username—all of which relate to an advertisement event. With the metadata 144, user information receiver 122 generates three separate HTTP headers, HTTP headers 303, 305, and 307, which follow proper syntax. For instance, header types 306, 310, and 314 are separated from their respective values 308, 312, and 316 with colon symbols. These HTTP headers may be combined with HTTP header 301 to create a set of HTTP headers that contain information regarding the advertisement context to track the advertisement using a tracking service.

Turning back to FIG. 1, HTTP header generator 124 may generate HTTP headers based on received HTTP headers from user information receiver 122. HTTP header generator 124 may generate HTTP headers (1) in response to an advertisement event, and (2) in response to a request to augment a preexisting set of HTTP headers with additional HTTP headers for tracking purposes.

With generated HTTP headers from user information receiver 122, HTTP header generator 124 may compile the received HTTP headers and encode them for transmission with a URL call. For instance, HTTP header generator 124 may generate a set of HTTP headers with appropriate syntax to separate each HTTP header.

HTTP header generator 124 may also receive requests to append additional HTTP headers to a preexisting set of HTTP headers. For instance, HTTP header generator 124 may receive HTTP headers from user information receiver 122 and append those HTTP headers to a preexisting set of HTTP headers. In some aspects, once the augmented HTTP headers have been generated, the set of HTTP headers may be sent to tracking engine 132.

Turning to FIG. 3, HTTP header generator 124 generates a set of HTTP headers 300 based on HTTP headers sent by user information receiver 122. For the purposes of this example, HTTP header may receive header 301 and a request to append additional HTTP headers, headers 303, 305, and 307, encoded by user information receiver 122. To generate a set of HTTP headers that have additional, detailed tracking information, HTTP header generator 124 appends headers 303, 305, and 307 generated by user information receiver 122 to preexisting HTTP header 301. Once compiled, HTTP header generator 124 may send the augmented set of HTTP headers to tracking engine 132 for forwarding to a tracking service.

Landing page engine 126 is illustrated as including landing page generator 128 and middleware handler 130. Landing page engine 126 may generate landing page content and route URL calls and HTTP headers for processing by the tracking engine 132.

Landing page generator 128 may receive a request for landing page content. For instance, once a user clicks on an advertisement, a URL call transmitted to domain server 108 and transmitted to landing page engine 126 is received. In some aspects, the URL call may include a request for landing page content. In response, landing page generator 128 retrieves landing page content for an item corresponding to the URL call and advertisement. In some aspects, the landing page content may include embedded middleware that continues to track a user's movements and transmit URL calls and HTTP headers. For instance, if a user inputs account information to login to the advertiser's website while on the landing page, the embedded middleware may generate and transmit URL calls and HTTP headers to relay this information to the tracking service.

Landing page generator 128 may generate code (e.g., HTML, CSS, JavaScript, SQL, PHP, Python) necessary to render the landing page content in a browser and/or in an application on client-computing devices 102 and 104. For instance, landing page generator 128 may generate code to render a webpage for an advertised item, such as a dress, that includes an item description, price, and other details that are relevant to the advertised item. In some aspects, landing page generator 128 transmits the generated code, which includes embedded middleware, to domain server 108 to transmit to client-computing devices 102 and 104 for rendering.

Middleware handler 130 may receive URLs calls and HTTP headers from middleware embedded in the landing page. Middleware handler 130 may then route the URL calls and HTTP headers to tracking engine 132 for processing and tracking purposes. For example, if a user input account credentials, then the embedded middleware may transmit a URL call and HTTP headers to middleware handler 130 with parameters and headers describing the an identifier associated with the user. In some aspects, these received URL parameters and HTTP headers are further augmented via URL engine 112 and HTTP header engine 120 to transmit to a tracking service for tracking purposes.

Tracking engine 132 is illustrated as including HTTP header processor 134, URL processor 136, and tracking handler 138.

Tracking engine 132 may receive URLs, HTTP headers, and other user information regarding an advertisement event from client-computing devices 102 and 104 and transmit additional URLs and HTTP headers to a tracking service to internally track and log an advertisement using its context.

HTTP header processor 134 may receive HTTP headers from client-computing devices 102 and 104. In some aspects, the HTTP headers are received from a browser or application on client-computing devices 102 and 104 via domain server 108 in response to an advertisement event, such as a user clicking on an advertisement or moving a cursor to different portions of an item landing page. HTTP headers may also be received from the middleware embedded in the landing page content on the browser or application on client-computing devices 102 and 104.

In response to receiving the HTTP headers from client-computing devices 102 and 104, the HTTP header processor 34 may operate with database 110 to retrieve metadata 144 regarding the user and/or user device associated with an advertisement event. In some aspects, HTTP header processor 134 may also receive user information or user device information from cookies stored on the user device or a user's account information. For instance, HTTP header processor 134 may receive a HTTP header that includes a user identifier. Based on the user identifier, the HTTP header processor may operate with database 110 to retrieve additional metadata 144 about the user such as the user's username, which may all be sent to a tracking service.

In addition, with respect to received HTTP headers, HTTP header processor 134 may also retrieve information regarding an advertisement event and/or information regarding a publisher that published the ad. For instance, if an advertisement event was published by an advertisement publisher, then HTTP header processor 134 may retrieve metadata 144 regarding the publisher. Likewise, HTTP header processor 134 may also retrieve metadata 144 regarding whether the user that triggered an advertisement event ultimately purchased the advertised item (which may affect that amount of payment due to the publisher).

HTTP header processor 134 may transmit the HTTP headers received from client-computing devices 102 and 104 in conjunction with the collected metadata 144 and user information HTTP header engine 120 to generate another set of HTTP headers that will be sent to the tracking service. Said another way, metadata 144 and user information associated with an advertisement is sent to HTTP header engine 120 in order to generate additional HTTP headers that will appended to the original set of received HTTP headers.

Turning briefly to FIG. 3, example HTTP headers 300 are provided. HTTP header 301, which describes the website address preceding a triggering advertisement event, has a header type 302 and a value 304 and is transmitted by a client-computing device 102. In this example, HTTP header 301 is transmitted to domain server 108 upon a triggering advertisement event. In response to receiving HTTP header 301, HTTP header processor 134 parses HTTP header 301 and retrieves additional metadata 144, in operation with database 110, regarding the advertisement and the user that triggered the advertisement event. For example, HTTP header processor 134 parses HTTP header 301 to determine that the value 304, which is AdPublisher in this example, is the referring website with respect to the advertisement event. HTTP header processor 134 may then retrieve information regarding whether the advertisement resulted in a sale, which may affect payment terms associated with AdPublisher, to be forwarded to a tracking service. In addition, HTTP header processor 134 may retrieve a user identifier and Globally Unique Identifier based on user information stored in a cookie on client-computing devices 102 and 104. Using these user-specific values, HTTP header processor 134 may also retrieve a username that is associated with the advertisement event from database 110. The received metadata 144, in addition to the original set of HTTP headers, may be sent to HTTP header engine 120 to generate an augmented set of HTTP headers that may then be forwarded to a tracking service.

Turning back to FIG. 1, URL processor 136 may receive URL calls from client-computing devices 102 and 104. The URL calls may be received from client-computing devices 102 and 104 via a browser or application on those devices in response to user input. In some aspects, the URL call may be from the middleware embedded in the browser or application on client-computing devices 102 and 104. The user input triggering a URL call may be a variety of user interactions related to an advertisement event. For instance, a user clicking on an advertisement may cause a URL call to be transmitted. Similarly, a user navigating a cursor to different portions of the landing page may prompt the transmission of URL calls via the embedded middleware from landing page engine 126 to URL processor 136.

URL processor 136 may also parse the parameters appended to a URL. For instance, URL processor 136 may parse out the parameters in the query string of the URL by identifying the syntax separating the parameters and extracting the parameters stored between designated syntax (e.g., ampersands). With the extracted parameters, URL processor 136 may operate with database 110 to retrieve metadata 144 related to the user and/or an advertisement event. For example, URL processor 136 may extract parameters from the received URL regarding a tracking identifier associated with an advertisement event. Based on the tracking identifier, URL processor 136 may operate with database 110 to access tracking identifier 142 to determine the publisher that is associated with the advertisement. Likewise, URL processor 136 may also parse the parameters and retrieve metadata 144 based on advertisement context. For instance, URL processor 136 may receive a parameter relating to the user's interaction with an advertisement (e.g., a user clicked on an advertisement in an email) and determine the placement and position of the advertisement from metadata 144 in operation with database 110.

URL processor 136 may also transmit the original received URL along with the associated metadata 144 to the URL engine 112 to generate a new URL. For example, URL processor 136 may transmit the URL received from client-computing devices 102 and 104 along with the user's username and advertisement campaign information regarding advertisement to URL engine 112 to generate a new URL that includes the original URL parameters along with additional parameters reflecting the associated metadata.

Turning briefly to FIG. 2, example URLs 200 are provided. URL 201 includes parameters 205 and 207, which are separated by ampersands. In this example, URL processor 136 parses the parameters 205 and 207 based on the syntax markers, such as the ampersands and the question mark. Each parameter name 206 and 210 has a corresponding parameter value, values 208 and 212, respectively. For example, parameter 205 relates to a publisher of an advertisement that triggered an advertisement event and has value 208, which is AdPublisher in this example. Likewise, parameter 207 relates to the country that the advertisement is geared toward, such as Germany. Using the values 208 and 212, as they correspond to parameters 205 and 207, URL processor 136 retrieves metadata 144 and tracking identifiers 142 in operation with database 110. URL processor 136 sends the metadata 144 and tracking identifiers 142, coupled with the original received URL, to the URL engine 112 to generate a new URL to send to the tracking service.

Tracking handler 138 receives augmented URLs and HTTP headers and facilitates transmission of URL calls and HTTP headers to a tracking service that tracks and logs advertisements using advertisement context. Tracking handler 138 may operate with URL engine 112 and HTTP header engine 120 to receive augmented URLs and HTTP headers that include the original parameters and headers, respectively, along with the associated metadata and user information compiled by HTTP header processor 134 and URL processor 136.

Once HTTP headers and the URL have been augmented by URL engine 112 and HTTP header engine 120 and sent to tracking handler 138, tracking handler 138 forwards the augmented URL and HTTP headers to a tracking service. Said another way, tracking handler 138 (1) receives preexisting URL and HTTP headers augmented with metadata regarding the user and advertisement context, and (2) sends the newly generated URL and HTTP headers to the tracking service for internal tracking purposes. The tracking service (not shown) may then parse the augmented URL and HTTP headers and log information regarding the advertisement as well as measure metrics of an advertisement's success, such as which advertisements are turned into sales.

It will be understood that the components of the URL engine 112, HTTP header engine 120, landing page engine 126, and tracking engine 132 may be discrete algorithms or models. However, as noted, components of URL engine 112, HTTP header engine 120, landing page engine 126, and tracking engine 132 are described as discrete components to aid in describing the technology. Although in other embodiments intended by this disclosure, the functions of these components may overlap or be further divided. Thus, it will also be understood that other embodiments of the technology include a combined implementation of these components. For instance, the tracking engine 132 may be a modification to the URL engine 112 (a modified URL engine) that incorporates parsing incoming URL calls and generating new URLs. In such cases, the modified URL engine can determine additional metadata to include in the URL and generate parameters to augment a preexisting URL. While the disclosure describes these (and other) components separately, it is intended that this also includes modified or combined implementations of these components. That is, for example, where functions are separately described as "generating a URL" and "processing a URL," it is intended that these separately disclosed steps also include a single action of processing an incoming URL call to determine additional metadata to include and generating a new URL that incorporates the additional metadata by a modified URL generator.

Methods may be performed using the concurrent browsing system described herein. In embodiments, one or more computer storage media having computer-executable instructions embodied thereon that, when executed, by one or more processors, cause the one or more processors to perform the methods in the search system.

Figure 4:
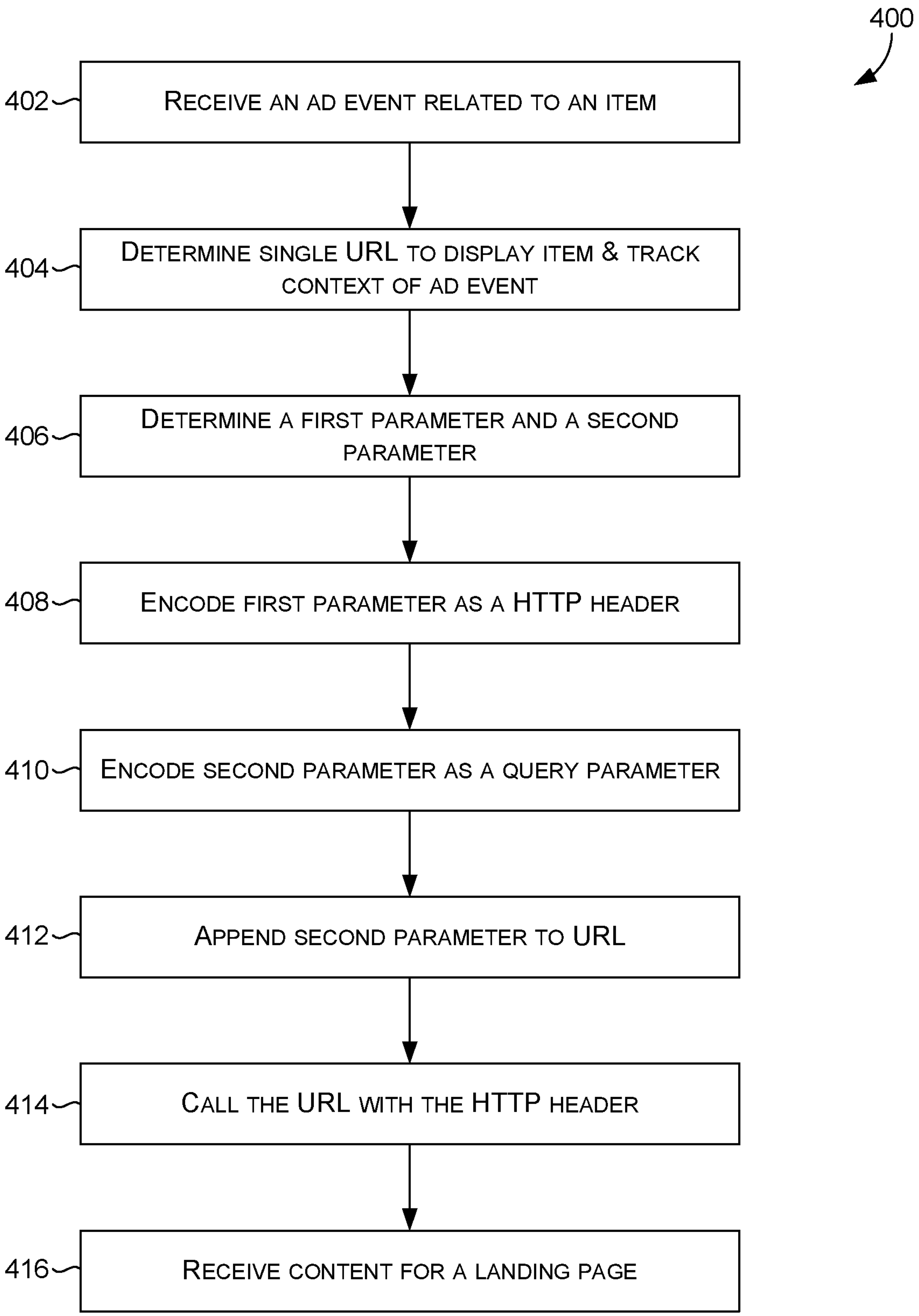
FIG. 4 is a block diagram illustrating an example method for generating a URL and HTTP headers in response to an advertisement event, in accordance with aspects described herein.

One example for receiving an advertisement event, determining URL parameters and HTTP headers, generating a URL and HTTP headers, calling the URL and HTTP headers, and receiving landing page content is illustrated by method 400 of FIG. 4. At block 402, an advertisement event related to an item is received. The advertisement event is triggered based a user's interactions with an advertisement displayed on a browser or application installed on a client-computing device. The advertisement event may be accompanied by a request to generate a URL and HTTP headers to direct the user to a landing page that is associated with the advertised item. URL engine 112 of FIG. 1 is an example URL engine that can be used by the method. Likewise, HTTP header engine 120 of FIG. 1 is an example HTTP header engine that can be used by the method. At block 404, a single URL to display the advertised item and track context of the advertisement event is determined. The single URL, when called, may request landing page content associated with the advertised item. For instance, the URL may include the domain name associated with an advertiser of the item in order to immediately direct the user to an item landing page of an advertiser versus a redirection link. The URL may also include the names of additional servers that any calls of that URL should be routed to. URL engine 112 of FIG. 1 is an example URL engine that can be used by the method. At block 406, a first parameter and a second parameter are determined. The first parameter may be related to the advertisement event, while the second parameter may be related to tracking the advertisement event. For example, the first parameter may be a referrer field that describes the website that preceded the user triggering an advertisement event. Likewise, the second parameter may describe the location of a client-computing device. Metadata receiver 114 of FIG. 1 is an example metadata receiver and parameter generator that can be used by the method. Likewise, user information receiver 122 of FIG. 1 is an example user information receiver and parameter generator that can be used by the method.

At block 408, the first parameter is encoded as a HTTP header. Using metadata and user information related to the advertisement, the first parameter may be encoded for transmission as a HTTP header. The HTTP header may be generated by encoding the parameter using the appropriate syntax. HTTP header generator 124 of FIG. 1 is an example HTTP header generator that can be used by the method. At block 410, the second parameter is encoded as a query parameter. Using metadata and user information that pertain to the advertisement, the query parameter is encoded using syntax to denote the parameter type and parameter value. Metadata receiver 114 of FIG. 1 is an example metadata receiver and parameter generator that can be used by the method.

At block 412, the second parameter is appended to the URL. The encoded query parameter is appended to the single URL generated to display the advertised item and track context of the advertisement event. Appropriate syntax, such as syntax used to separate query parameters, may be included when generating the augmented URL. URL generator 118 of FIG. 1 is an example URL generator that can be used by the method.

At block 414, the URL is called with the HTTP header. The URL call and HTTP header are transmitted from a browser or application on a client-computing device to a domain server for processing. The URL call and HTTP header may include a request to receive landing page content for the advertised item. Landing page engine 126 of FIG. 1 is an example landing page engine suitable for use by the method. At block 416, landing page content is received. The landing page content may be transmitted by the domain server to the client-computing device. In some aspects, the landing page content may include embedded software or middleware that can be used to track additional user interactions with the landing page content. Landing page engine 126 of FIG. 1 is an example landing page engine suitable for use by the method.

Figure 5:
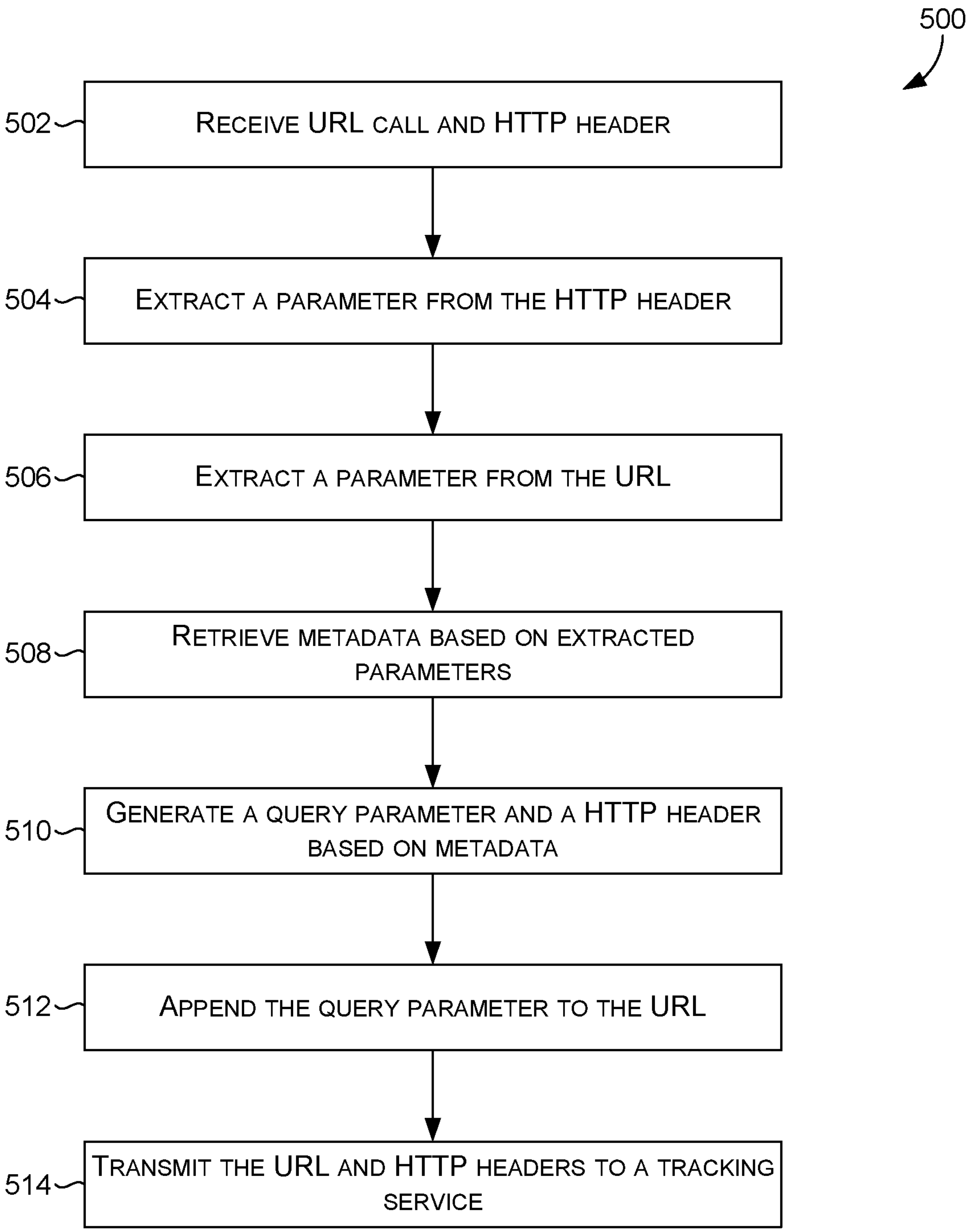
FIG. 5 is a block diagram illustrating an example method for generating additional URL and HTTP headers to append to a received URL and received HTTP headers in order to track an advertisement based on its context, in accordance with aspects described herein.

One example for generating and appending additional URL and HTTP headers to track an advertisement based on its context is illustrated by method 500 of FIG. 5. At block 502, a URL call and HTTP header are received. The URL call and HTTP header may be received from a browser or application on a client-computing device. In some aspects, the URL call and HTTP header may be received from software or middleware embedded in landing page content displayed on a browser or application on the client-computing device. Additional information, such as cookie information stored on the client-computing device may also be received. HTTP header processor 134 of FIG. 1 is an example HTTP header processor suitable for use by the method. Likewise, URL processor 136 of FIG. 1 is an example URL processor suitable for use by the method. At block 504, a parameter is extracted from the received HTTP header. The HTTP header value may be extracted from the HTTP header based on the syntax. HTTP header processor 134 of FIG. 1 is an example HTTP header processor suitable for use by the method. At block 506, a parameter is extracted from the URL. Based on the syntax used to construct URLs, parameters may be extracted from the URL. The parameter type and parameter value may also be extracted. URL processor 136 of FIG. 1 is an example URL processor suitable for use by the method.

At block 508, metadata is retrieved based on the extracted parameters. The metadata associated with parameters may be retrieved using information about the user and the advertisement. For example, information regarding the user may be extracted from the parameters. Using the extracted information, metadata and user information such as the best guess of a user's username may be retrieved. Metadata receiver 114 of FIG. 1 is an example metadata receiver suitable for use by the method. User information receiver 122 of FIG. 1 is an example user information receiver suitable for use by the method. At block 510, a parameter and HTTP header are generated based on the metadata. For example, if the metadata included the user's potential username and a user's potential unique identifier, then each of these pieces of information may be encoded into a URL parameter or a HTTP header. Metadata receiver 114 of FIG. 1 is an example metadata receiver and parameter generator that can be used by the method. Likewise, user information receiver 122 of FIG. 1 is an example user information receiver and parameter generator that can be used by the method. At block 512, the query parameter and HTTP header are appended. The query parameter may be appended to the URL received in step 502. Similarly, the generated HTTP header may be appended to the HTTP header received in step 502. URL generator 118 of FIG. 1 is an example URL generator that can be used by the method. HTTP header generator 124 of FIG. 1 is an example HTTP header generator that can be used by the method. At block 514, the URL and HTTP headers are transmitted to a tracking service. The appended URL and HTTP headers, which contain metadata related to the advertisement event may be transmitted to a tracking service for additional processing and logging of advertisements based on context. Tracking handler 138 of FIG. 1 is an example tracking handler that can be used by the method.

Having described an overview of embodiments of the present technology, an example operating environment in which embodiments of the present technology may be implemented is described below in order to provide a general context for various aspects. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The distributed computing environment depicted herein is merely an example. Components can be configured for performing novel aspects of the technology, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A method comprising:

on a client-computing device, receiving an ad event related to an item; and in response to the ad event:

determining a single Uniform Resource Locator (URL) to provide content for the item and track the ad event, the single URL identifying a domain server;

determining a parameter related to the ad event;

encoding the parameter as a part of the single URL or as a Hypertext Transfer Protocol (HTTP) header;

calling the single URL without the client-computing device calling a second URL, wherein in response to the client-computing device calling the single URL, the domain server: (1) provides the content for the item to the client-computing device without a redirection, (2) extracts the parameter from the single URL or the HTTP header, and (3) asynchronously initiates tracking of the ad event using the parameter; and receiving, from the domain server, the content for the item.

2. The method of claim 1, wherein the ad event is triggered based on a user interaction with an ad displayed by a browser or application on the client-computing device.

3. The method of claim 2, wherein the parameter identifies a publisher of the ad or a location of the client-computing device.

4. The method of claim 1, wherein the domain server determines a context associated with the ad event based on the parameter and asynchronously requests tracking of the ad event based on the context.

5. The method of claim 4, wherein the content comprises a landing page, and wherein the landing page has embedded software to track the ad event based on the context.

6. The method of claim 5, wherein the method further comprises transmitting, based on the embedded software, a second HTTP header, the second HTTP header encoding a second parameter.

7. The method of claim 6, wherein the second parameter relates to location of received clicks on the landing page.

8. One or more computer storage media having computer-executable instructions embodied thereon that, when executed by one or more processors, cause the one or more processors to perform operations, the operations comprising:

on a client-computing device, receiving an ad event related to an item; and in response to the ad event:

determining a single Uniform Resource Locator (URL) to provide content for the item and track the ad event, the single URL identifying a domain server;

determining a parameter related to the ad event;

encoding the parameter as a part of the single URL or as a Hypertext Transfer Protocol (HTTP) header;

calling the single URL without the client-computing device calling a second URL, wherein in response to the client-computing device calling the single URL, the domain server: (1) provides the content for the item to the client-computing device without a redirection, (2) extracts the parameter from the single URL or the HTTP header, and (3) asynchronously initiates tracking of the ad event using the parameter; and receiving, from the domain server, the content for the item.

9. The one or more computer storage media of claim 8, wherein the ad event is triggered based on a user interaction with an ad displayed by a browser or application on the client-computing device.

10. The one or more computer storage media of claim 9, wherein the parameter identifies a publisher of the ad or a location of the client-computing device.

11. The one or more computer storage media of claim 8, wherein the domain server determines a context associated with the ad event based on the parameter and asynchronously requests tracking of the ad event based on the context.

12. The one or more computer storage media of claim 11, wherein the content comprises a landing page, and wherein the landing page has embedded software to track the ad event based on the context.

13. The one or more computer storage media of claim 12, wherein the operations further comprise transmitting, based on the embedded software, a second HTTP header, the second HTTP header encoding a second parameter.

14. The one or more computer storage media of claim 13, wherein the second parameter relates to location of received clicks on the landing page.

15. A system comprising:

one or more processors; and one or more computer storage media storing computer-useable instructions that, when used by the one or more processors, cause the one or more processors to perform operations comprising:

on a client-computing device, receiving an ad event related to an item; and in response to the ad event:

determining a single Uniform Resource Locator (URL) to provide content for the item and track the ad event, the single URL identifying a domain server;

determining a parameter related to the ad event;

encoding the parameter as a part of the single URL or as a Hypertext Transfer Protocol (HTTP) header;

calling the single URL without the client-computing device calling a second URL, wherein in response to the client-computing device calling the single URL, the domain server: (1) provides the content for the item to the client-computing device without a redirection, (2) extracts the parameter from the single URL or the HTTP header, and (3) asynchronously initiates tracking of the ad event using the parameter; and receiving, from the domain server, the content for the item.

16. The system of claim 15, wherein the ad event is triggered based on a user interaction with an ad displayed by a browser or application on the client-computing device, and wherein the parameter identifies a publisher of the ad or a location of the client-computing device.

17. The system of claim 15, wherein the domain server determines a context associated with the ad event based on the parameter and asynchronously requests tracking of the ad event based on the context.

18. The system of claim 17, wherein the content comprises a landing page, and wherein the landing page has embedded software to track the ad event based on the context.

19. The system of claim 18, wherein the operations further comprise transmitting, based on the embedded software, a second HTTP header, the second HTTP header encoding a second parameter.

20. The system of claim 19, wherein the second parameter relates to location of received clicks on the landing page.

* * * * *